United States Patent
Restivo

(10) Patent No.: US 10,539,190 B2
(45) Date of Patent: Jan. 21, 2020

(54) ROLLING BEARING WITH IMPROVED SEALING DEVICE

(71) Applicant: Aktiebolaget SKF, Gothenburg (SE)

(72) Inventor: Riccardo Restivo, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 97 days.

(21) Appl. No.: 15/824,280

(22) Filed: Nov. 28, 2017

(65) Prior Publication Data

US 2018/0335088 A1 Nov. 22, 2018

(30) Foreign Application Priority Data

Nov. 28, 2016 (IT) .................. 102016000119828

(51) Int. Cl.
| | |
|---|---|
| *F16C 33/78* | (2006.01) |
| *F16C 33/80* | (2006.01) |
| *F16C 33/58* | (2006.01) |
| *F16C 19/06* | (2006.01) |

(52) U.S. Cl.
CPC .......... *F16C 33/7859* (2013.01); *F16C 19/06* (2013.01); *F16C 33/785* (2013.01); *F16C 33/7879* (2013.01); *F16C 33/80* (2013.01); *F16C 33/58* (2013.01); *F16C 2361/65* (2013.01)

(58) Field of Classification Search
CPC .... F16C 19/06; F16C 33/785; F16C 33/7859; F16C 33/7879; F16C 33/7896; F16C 33/80; F16C 2361/65; F16F 33/805

USPC ........ 384/477, 478, 480, 488, 490; 477/361, 477/376, 380, 412; 277/361, 376, 380, 277/412, 345, 350

See application file for complete search history.

(56) References Cited

U.S. PATENT DOCUMENTS

| | | | | |
|---|---|---|---|---|
| 2,152,444 | A | * 3/1939 | Searles | ................... F16C 33/80 277/419 |
| 2,267,875 | A | 12/1941 | Reynolds | |
| 2,385,306 | A | 9/1945 | Shafer | |
| 2,405,122 | A | * 8/1946 | Firth | ................... F16C 33/7886 277/362 |

(Continued)

FOREIGN PATENT DOCUMENTS

| | | | |
|---|---|---|---|
| DE | 3212976 A1 | 10/1983 | |
| EP | 1167793 A3 | * 3/2004 | ............ F16C 33/785 |

(Continued)

*Primary Examiner* — Marcus Charles

(74) *Attorney, Agent, or Firm* — Garcia-Zamor Intellectual Property Law, LLC; Ruy Garcia-Zamor; Bryan Peckjian

(57) ABSTRACT

A rolling bearing with sealing device provided on each side of the rolling bearing in order to prevent the entry of contaminants inside the rolling bearing, the rolling bearing having a non-rotating outer ring and a rotating inner ring and with a plurality of rolling bodies placed between them. The sealing device provided with first and second shields arranged axially in series between them across a cavity defined by the two rings, the first shields integral with the outer ring and the second shields integral with the inner ring and defining with the first shields an annular gap, which has a substantially constant axial thickness and is radially bounded by a first sealing labyrinth arranged in the region of the outer ring and a second sealing labyrinth arranged in the region of the inner ring.

3 Claims, 1 Drawing Sheet

(56) References Cited

U.S. PATENT DOCUMENTS

| | | | | |
|---|---|---|---|---|
| 2,856,208 A * | 10/1958 | Cobb | | F16C 33/7863 |
| | | | | 277/369 |
| 3,129,985 A | 4/1964 | Watson | | |
| 3,519,316 A * | 7/1970 | Gothberg | | F16C 33/768 |
| | | | | 277/367 |
| 3,550,974 A * | 12/1970 | Kupchick | | F16C 33/80 |
| | | | | 384/480 |
| 3,768,880 A * | 10/1973 | Howe | | F16C 33/7896 |
| | | | | 384/480 |
| 5,435,654 A * | 7/1995 | Ishida | | F16C 33/783 |
| | | | | 384/488 |
| 6,402,387 B2 * | 6/2002 | Obara | | F16C 33/78 |
| | | | | 384/477 |
| 6,595,695 B1 * | 7/2003 | Goto | | F16C 33/7853 |
| | | | | 384/482 |
| 8,845,200 B2 * | 9/2014 | Winkelmann | | F16C 33/7853 |
| | | | | 384/477 |
| 8,864,385 B2 * | 10/2014 | Varnoux | | F16C 33/7859 |
| | | | | 384/478 |
| 8,956,052 B2 * | 2/2015 | Hofbauer | | F16C 33/7806 |
| | | | | 277/551 |
| 2002/0015543 A1 * | 2/2002 | Pairone | | F16C 33/785 |
| | | | | 384/477 |
| 2007/0154124 A1 * | 7/2007 | Inoue | | F01D 25/16 |
| | | | | 384/488 |
| 2011/0075958 A1 * | 3/2011 | Yamaguchi | | F16C 33/7853 |
| | | | | 384/484 |
| 2015/0377299 A1 * | 12/2015 | Varnoux | | F16C 33/768 |
| | | | | 384/479 |
| 2016/0076596 A1 * | 3/2016 | Baracca | | F16C 33/7823 |
| | | | | 384/480 |

FOREIGN PATENT DOCUMENTS

| | | | | |
|---|---|---|---|---|
| EP | 2500593 A1 * | 9/2012 | | F16C 33/7823 |
| EP | 2995829 B1 * | 9/2017 | | F16C 33/7823 |
| GB | 793407 A | 4/1958 | | |
| JP | H11230179 A | 8/1999 | | |
| JP | 2007211753 A | 8/2007 | | |
| JP | 2009204142 A | 9/2009 | | |

* cited by examiner

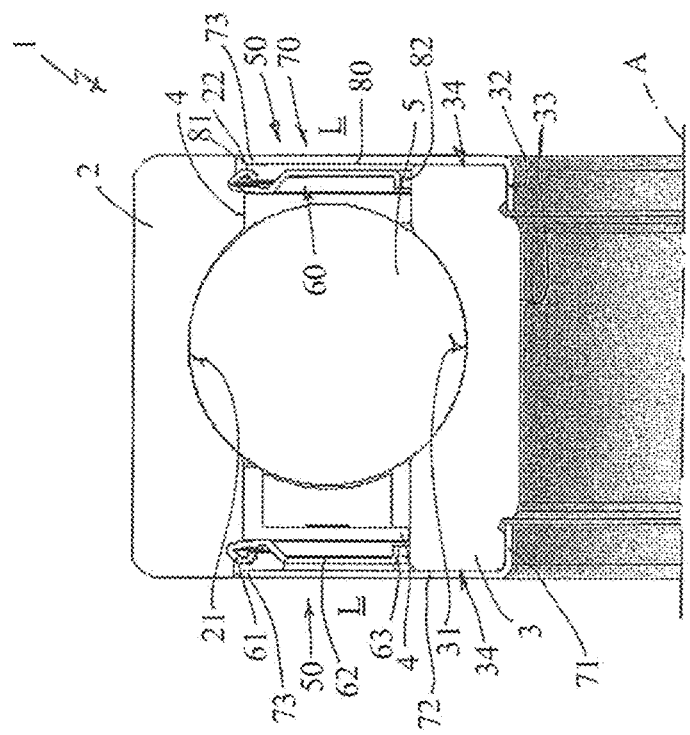
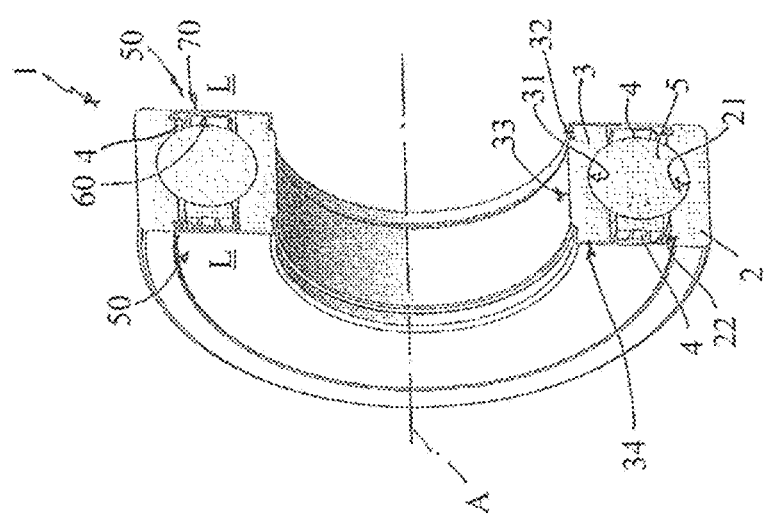
FIG. 1
FIG. 2

ROLLING BEARING WITH IMPROVED SEALING DEVICE

CROSS-REFERENCE

This application claims priority to Italian patent application no. 102016000119828 filed on Nov. 28, 2016, the contents of which are fully incorporated herein by reference.

TECHNOLOGICAL FIELD

The present invention relates to a rolling bearing with improved sealing device.

The present invention is particularly suitable, although not exclusively, for rolling bearings with sealing device intended for gear-boxes in vehicles. The invention is also suitable for any type of revolving or rolling body (balls, rollers, tapered rollers, etc.).

BACKGROUND

The rolling bearings with sealing device of the known type comprise, in general:
- a non-rotating outer ring suitable for being inserted inside a seat of a gear-box and provided with a radially inner raceway;
- a rotating inner ring, which is arranged within the outer ring so as to be engaged by a shaft of the gear-box, defines with the outer ring an annular cavity on each side of the rolling bearing and is provided with a radially outer raceway; and
- a plurality of revolving or rolling bodies placed between the outer ring and the inner ring within the raceways in order to allow the relative rotation of the inner ring with respect to the outer ring about an axis of rotation of the rolling bearing.

The known rolling bearings of the type described above and mounted inside gear-boxes must be able to operate in environments where there is a high concentration of lubricating oil, usually in suspension inside the gear-box; therefore, they further comprise, for each side of the rolling bearing, a sealing device arranged inside the associated cavity in order to prevent the entry of contaminants inside the bearing and comprising an annular shield which is snap-engaged inside a respective annular groove formed in the outer ring in a lateral position with respect to the raceway and extends radially towards the inner ring and across the entire cavity, therefore having a free end facing the inner ring.

In particular, the free end is substantially seated inside a respective axially open annular groove which is formed in the inner ring so as to form a labyrinth seal with a complex form designed to prevent the entry of any contaminants into the bearing and is formed on each side of the inner ring alongside the associated raceway.

The need to create a labyrinth seal with a complex form between the free end and the inner ring on each side of the bearing by means of the creation of an axially open annular groove for each sealing device has the consequence that the rolling bearings with sealing device of the known type described above require relatively long machining times, which are all the longer the radially deeper the axially open annular grooves must be. Moreover, these machining times will be even longer the axially deeper these axially open annular grooves lie, and the axial depth of these axially open grooves will be all the greater the greater the axial depth inside the cavity at which the annular shield must be positioned, and/or will be all the greater the greater the difference in axial thickness of the inner ring with respect to the outer ring.

SUMMARY

The object of the present invention is to provide a rolling bearing with improved sealing device which not only allows the sealing capacity to be improved, but also does not have the drawbacks described above, namely has a geometry form such as to allow a substantial reduction of the production cycle time.

According to the present invention a rolling bearing with improved sealing device having the characteristic features described in the accompanying claims is provided.

BRIEF DESCRIPTION OF THE DRAWINGS

The invention will now be described with reference to the accompanying drawings which illustrate a non-limiting example of embodiment thereof, in which:

FIG. 1 is a perspective view, with parts cross-sectioned, of a preferred embodiment of a rolling bearing with sealing device provided according to the present invention; and FIGS. 2 shows, on a larger scale, a cross-sectional view of the bearing according to FIG. 1.

DETAILED DESCRIPTION

With reference to FIG. 1, 1 denotes in its entirety a rolling bearing which has an axis A of rotation and provides a non-rotating outer ring 2 provided with a radially inner raceway 21; a rotating inner ring 3, which is arranged within the outer ring 2, is provided with a radially outer raceway 31 and defines with the outer ring 2 an annular cavity 4 on each side L of the rolling bearing 1; and a plurality of rolling bodies 5 placed between the outer ring 2 and the inner ring 3 within the raceways 21 and 31 in order to allow the relative rotation of the inner ring 3 with respect to the outer ring 2 about the axis A of rotation of the bearing.

The rolling bearing 1 according to the present invention is preferably, but not necessarily, suitable for being used in gear-boxes of vehicles, which generally comprise an external housing (known and not shown), an input shaft (known and not shown) leading from an engine and an output shaft (known and not shown) connected to the driving wheels of the vehicle. The non-rotating outer ring 2 comprises, preferably on each side L of the rolling bearing 1, an annular groove 22 arranged laterally with respect to the raceway 21 and is suitable for being inserted inside a seat of the external housing, while the inner ring 3 comprises, preferably on each side L of the rolling bearing 1, a cylindrical seat 32 arranged radially on the opposite side to the raceway 31 and is suitable for engagement by one of the two shafts. Moreover, in the present description, the rolling bodies 5 to which reference will be made will be balls, without however excluding the extension of the present invention to include other types of rolling bodies, such as rollers, tapered rollers, etc.

Considering that in the gear-box there are normally present high concentrations of lubricating oil, which is usually in suspension, and containing, moreover, metallic impurities due to wear of the mechanical components of the gear-box, the rolling bearing 1 further comprises, preferably for each side L, a sealing device 50 for preventing the entry of contaminants inside the rolling bearing 1. The description below will refer to a rolling bearing 1 in which both the sides L are provided with a respective sealing device 50, and the sealing device 50 on one side has the same configuration 50 as the sealing device 50 on the other side: however, depending on the type of assembly and application, the rolling bearing 1 according to the present invention could have a single sealing device 50 arranged on one side L only, or two sealing devices also with configurations differing from each other. Therefore, the outer ring 2 could also be provided with a single groove 22 and likewise the inner ring 3 could be provided with a single cylindrical seat 32. Since the description here refers to a rolling bearing 1, in which both the sides L are provided with a respective sealing device 50, two grooves 22 and two seats 32 will also be taken into consideration and, in particular, with reference to the cylindrical seats 32, it must be pointed out that these seats 32 are formed by means of machining with stock removal across an inner cylindrical surface 33 of the inner ring 3 and extend axially inside the inner ring 3 from respective lateral annular surfaces 34 of the inner ring 3. The radial dimensions Dr and axial dimensions Da of the seats 32 will be indicated further below in the present description, although it should be pointed out straightaway that these dimensions Dr and Da are such as to require a very short machine cycle time for their execution since, both for the radial dimension Dr and for the axial dimension Da, deep machining of the material is not required.

In accordance with that shown also in FIG. 2, each sealing device 50 according to the present invention comprises a first annular shield 60, which is snap-engaged inside the annular groove 22 and extends radially towards the inner ring 3 and across the cavity 4, and a second annular shield 70, which is mounted in the cylindrical seat 32 and extends radially towards the outer ring 2 and across the cavity 4 in an axially staggered position with respect to the shield 60. The first shield 60 and the second annular shield 70 define between them an annular gap 80, which has a substantially constant axial thickness and is radially bounded by a first sealing labyrinth 81 arranged in region of the outer ring 2 and a second sealing labyrinth 82 in the region of the inner ring 3.

In particular, the first annular shield 60 provides an elastic portion 61 snap-engaged inside the annular groove 22; a flanged portion 63 extending transversely with respect to the axis A of rotation across the cavity 4 from the elastic portion 61; and a cylindrical terminal portion 63 which is transverse to and integral with the flanged portion 62 and defines together with the inner ring 3 the sealing labyrinth 82.

In the example of embodiment shown, the cylindrical terminal portion 63 extends transversely from the flanged portion 62 towards the inside of the rolling bearing 1, but, in an alternative embodiment not shown and easily deducible from the present one, the cylindrical terminal portion 63 may extend, again transversely from the flanged portion 62, but towards the outside of the rolling bearing 1, namely towards the second shield 70. In both cases, the cylindrical terminal portion 63 defines the sealing labyrinth 82 with the inner ring 3 without obviously entering into frictional contact with the inner ring 3 and ensuring, therefore, both a seal and low friction, but in the case where the cylindrical terminal portion 63 extends towards the outside of the rolling bearing 1, a zone for accumulating the contaminating matter which may have penetrated through the gap 80 is created radially on the outside of the cylindrical terminal portion 63. This accumulation zone will increase further the sealing capacity of the sealing device 50 and may also be created along the flanged portion 62, modifying ad hoc this flanged portion 62, for example creating in the flanged portion 62 one or more axial recesses open towards the outside of the rolling bearing 1. In this case, not shown but easily deducible from the description above, the annular gap 80 will have an axial thickness which is substantially constant at least radially on the outside of the accumulation zones.

The second shield 70 instead includes a cylindrical portion 71 mounted inside the cylindrical seat 32; and a flanged portion 72, which is arranged axially in contact against the annular surface 34 and extends transversely with respect to the axis A of rotation across the cavity 4 from the annular portion 71 in a position axially facing the flanged portion 62 so as to bound axially with the flanged portion 62 the annular gap 80. Moreover, the flanged portion 72 has, radially on the opposite side to the annular portion 71, a free end 73 facing the outer ring 2 and defining with the outer ring 2 the sealing labyrinth 81. As described above, the flanged portion 62 could have one or more axial recesses open towards the outside of the rolling bearing 1 such as to define with the flanged portion 72 and along the gap 80 accumulation zones for the purpose of increasing further the sealing capacity of the sealing device 50. Instead, the flanged portion 72, which is arranged facing the outside of the rolling bearing 1, will always be linear and transverse to the axis A so as to ensure both that the axial thickness of the gap 80 is substantially constant at least outside the accumulation zones and that there is a well-defined axial volume of the rolling bearing 1. This substantial constant thickness in fact has the advantage of ensuring that the rotation of the shield 70 with respect to the shield 60, or of the flanged portion 72 with respect to the flanged portion 62, on the hand prevents the gradual advance of any contaminants which have accidentally penetrated into the gap 80 and their expulsion as a result of the centrifugal effect of the gap 80.

From the above description it is clear that both the shield 60 and the shield 70 have particularly simple and linear forms and geometries in order to keep costs for production and assembly thereof as low as possible. Moreover, the presence of two shields 60 and 70 axially facing each other and defining labyrinths 81 and 82 allows high sealing coefficients to be obtained without using contacting lips of rubbery material which are normally used in the standard solutions of the sealing devices for gear-boxes, this favouring in particular reduction of the friction and, therefore, the performance of the rolling bearing 1.

Moreover, both the shields 60 and 70 may be made both of plastic material and of metallic material depending on the severity of the applications for which the rolling bearing 1 is used. In both cases, the shields 60 and 70 have small thicknesses and, in particular, the shield 70 will have its own annular portion 71 with a radial thickness and axial thickness such as to ensure always correct mounting of the shield 70 in the seat 32, but also so as to allow smaller radial dimensions Dr and axial dimensions Da of the seat 32, ensuring at the same time also shorter machining times for execution thereof.

The axial dimensions of the inner ring 3 are smaller than the axial dimension of the outer ring 2 and, therefore, the shields 70, although being arranged next to the associated surfaces 34, will not project axially from the profiles of the outer ring 2. Moreover, since the radial length of the flanged portions 72 is greater, in terms of dimensions, than the radial length of the flanged portions 62, the former, in order to ensure the robustness of the sealing devices 50, will have an axial thickness greater in terms of dimensions than an axial thickness of the latter.

Finally, two further advantages offered by the rolling bearing 1 described above and by its sealing devices 50 must be emphasized. The shields 70 are integral with the rotating ring 3 and, therefore, during rotation of rotating ring 3, they will exert a centrifugal action on the lubricating oil reducing increasing the speed of flow of the lubricating precisely in the region of the labyrinth 81 and reducing even further any entry of such oil through 81. The centrifugal action will be most effective on the metallic impurities which are due to the wear of the mechanical components of the gear-box: these impurities, in fact, since they have a specific weight greater than that of the oil in suspension in which they are immersed, will tend to be removed with greater efficiency by the labyrinth 81 owing to the rotation of the shield 70. Moreover, the position of the labyrinths 81 and 82, their configuration and that of the gap 80 help prevent in particular the entry of contaminants, and in particular the metallic impurities, inside the rolling bearing 1 through the cavity 4. In fact, both the labyrinths 81 and 82 have a dynamic component which, in the case of the labyrinth 81, is formed by the free end 73, while in the case of the labyrinth 82 it is formed by the inner ring 3. This dynamic component will accentuate in both cases the centrifugal action of the sealing devices 50 on the lubricating oil and on any metallic impurities, tending to repel the entry of the contaminants inside the rolling bearing 1.

In addition to the embodiments of the invention, as described above, it is to be understood that numerous further variants exist. It must also be understood that embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A rolling bearing with a sealing device, the rolling bearing comprising:
   a non-rotating outer ring having a radially inner raceway;
   a rotating inner ring positioned within the non-rotating outer ring in order to define, with the non-rotating outer ring, an annular cavity on each side of the rolling bearing, and is provided with a radially outer raceway;
   rolling bodies positioned between the non-rotating outer ring and the rotating inner ring within the raceways in order to allow the rotation of the rotating inner ring with respect to the non-rotating outer ring and around a rotating axis (A) of the rolling bearing; and
   a sealing device positioned on each side of the rolling bearing in order to prevent the ingress of contaminants inside the rolling bearing; wherein
   the sealing device comprising first and second shields, that are axially placed in series through the annular cavity, the second shield being positioned axially outward from the first shield, the first shield is integral with the non-rotating outer ring and the second shield is integral with the rotating inner ring, the first shield and the second shield being positioned to define an annular gap therebetween, the second shield axially overlaps the inner ring and connects to an axially extending radial inner surface of the rotating inner ring;
   the annular gap having a substantially constant axial thickness and being delimited by a first and a second sealing labyrinth; and wherein
   the first sealing labyrinth is arranged in the region of the non-rotating outer ring and the second sealing labyrinth is arranged in correspondence of the inner ring
   wherein the non-rotating outer ring further comprises, on each side of the rolling bearing respectively, an annular groove that is laterally arranged to the radially inner raceway; the first shield providing: an elastic portion that is snapped into the annular groove; a first flanged portion that extends transversally to the rotating axis through the annular cavity starting from form the elastic portion; and a cylindrical terminal portion, which is transverse and integral with the flanged portion and defines second sealing labyrinth together with the inner ring;
   wherein the second flanged portion further comprises a free end that is arranged on the opposite side of the mounted annular portion, and faces the outer ring in order to define with the outer ring the first labyrinth seal, the free end of the second shield radially overlapping a portion of the elastic portion of the first shield.

2. The rolling bearing according to claim 1, wherein the first and the second sealing labyrinth have relevant dynamic components that exercise centrifugal actions on contaminants at the two opposite ends of the annular gap.

3. The rolling bearing according to claim 1, wherein the inner ring further comprises, on each side of the rolling bearing respectively, a cylindrical seat radially arranged on the opposite side of the radially outer raceway; second shield having: an annular portion mounted inside the cylindrical seat and a second flanged portion extending transversally to the rotating axis through the annular cavity starting from the mounted annular portion; the first and the second flanged portion defining between them an annular gap.

* * * * *